United States Patent
Wagner et al.

(10) Patent No.: US 10,294,149 B2
(45) Date of Patent: May 21, 2019

(54) LOW EMISSIVITY COATING FOR WINDOWS IN COLD CLIMATES

(71) Applicant: Vitro S.A.B. de C.V., Nuevo Leon (MX)

(72) Inventors: Andrew V. Wagner, Pittsburgh, PA (US); Michael J. Buchanan, Cranberry Township, PA (US)

( * ) Notice: Subject to any disclaimer, the term of this patent is extended or adjusted under 35 U.S.C. 154(b) by 0 days.

(21) Appl. No.: 15/240,437

(22) Filed: Aug. 18, 2016

(65) Prior Publication Data

US 2017/0240462 A1 Aug. 24, 2017

Related U.S. Application Data

(60) Provisional application No. 62/299,036, filed on Feb. 24, 2016.

(51) Int. Cl.
C03C 17/36 (2006.01)
E06B 3/67 (2006.01)
E06B 9/24 (2006.01)
E06B 3/66 (2006.01)

(52) U.S. Cl.
CPC .......... *C03C 17/366* (2013.01); *C03C 17/36* (2013.01); *C03C 17/3626* (2013.01); *C03C 17/3639* (2013.01); *C03C 17/3644* (2013.01); *C03C 17/3649* (2013.01); *C03C 17/3652* (2013.01); *C03C 17/3681* (2013.01); *C03C 17/3689* (2013.01); *E06B 3/66* (2013.01); *E06B 9/24* (2013.01); C03C 2217/24 (2013.01); C03C 2217/256 (2013.01); C03C 2217/258 (2013.01); C03C 2218/152 (2013.01); C03C 2218/156 (2013.01); *E06B 3/6715* (2013.01); *E06B 2009/2417* (2013.01); *Y02B 80/22* (2013.01); *Y02B 80/24* (2013.01)

(58) Field of Classification Search
CPC .............. C03C 17/366; C03C 17/3644; C03C 17/3681; C03C 17/3626; C03C 17/3649; C03C 17/3639; C03C 17/3652; C03C 17/3689; C03C 17/36; E06B 3/66; E06B 3/6715; Y02B 80/22; Y02B 80/24
See application file for complete search history.

(56) References Cited

U.S. PATENT DOCUMENTS 6,632,491 B1 * 10/2003 Thomsen ................ C03C 17/36 156/109
8,940,400 B1 * 1/2015 Wuillaume ............. C03C 17/36 428/426

FOREIGN PATENT DOCUMENTS

| EP | 1558950 B1 | 5/2006 |
| EP | 1476300 B2 | 4/2011 |
| WO | 2010129730 A1 | 11/2010 |
| WO | 2015034798 A1 | 3/2015 |
| WO | 2015190111 A1 | 12/2015 |

* cited by examiner

*Primary Examiner* — Donald J Loney

(57) ABSTRACT

A low emissivity coating 30 includes a plurality of phase adjustment layers 40, 50, 62; a first metal functional layer 46; and a second metal functional layer 58 located over and spaced from the first metal functional layer 46. A ratio of the geometric thickness of the first metal functional layer divided by the geometric thickness of the second metal functional layer is in the range of 0.6 to 1. The low emissivity coating 30 provides a reference IGU summer/day SHGC of at least 0.4 and a reference IGU winter/night U factor of no greater than 0.4 BTU/hr-ft$^2$-° F. (2.27 W/m2-K).

14 Claims, 3 Drawing Sheets

LOW EMISSIVITY COATING FOR WINDOWS IN COLD CLIMATES

CROSS-REFERENCE TO RELATED APPLICATION

This application claims priority to Provisional Application No. 62/299,036, filed Feb. 24, 2016, which is herein incorporated by reference in its entirety.

BACKGROUND OF THE INVENTION

Field of the Invention

This invention relates a low emissivity coating having a high solar heat gain coefficient (SHGC) and a low overall heat transfer coefficient (U factor). The coating is particularly useful for an insulating glass unit (IGU).

Technical Considerations

Conventional architectural window glass is highly thermally emissive. Solar energy easily passes through such glass. In order to reduce the passage of solar energy, low emissivity coatings are applied onto the glass. Low emissivity coatings act as thermal barriers that decrease the emission of radiant infrared (IR) energy, particularly thermal infrared energy. The lower the emissivity, the better the coating is in blocking the emission of thermal IR energy.

The solar heat gain coefficient (SHGC) is a measure of how well the window blocks solar heat. The lower the SHGC, the more solar heat is blocked, i.e., the lower the solar heat buildup inside the building.

The overall heat transfer coefficient (U factor) is a measure of heat loss through the window. The lower the U factor, the lower the heat transfer through the window, i.e. the higher the insulating level of the window.

Conventional low emissivity coatings for architectural windows typically are designed to provide a low SHGC and a low U factor. A low SHGC blocks solar energy, particularly solar infrared energy, passing through the window into the structure. These conventional low emissivity coatings help reduce air conditioning costs in the summer and are well suited for moderate and hot climates.

However, these conventional low emissivity coatings are not well suited for cold climates, such as climates having long winters and short summers or climates having extended periods of very cold weather. In cold climates, the concern for reducing air conditioning costs during the short summer months is much less than the concern for heating the building during the rest of the year. For cold climates, it would be desirable to provide a low emissivity coating that provides a higher SHGC than conventional low emissivity coatings while maintaining a low U factor. A high SHGC allows more solar heat to pass into the building to heat the interior of the building while a low U factor helps to keep the heat inside the building. Optionally, it also would be desirable for such a low emissivity coating to have a high visible light transmittance. High visible light transmittance allows more light to enter the building and decreases the need for lamps and artificial illumination. Optionally, it also would be desirable for such a low emissivity coating to have desirable aesthetics to meet the demands of the residential and commercial markets. These markets tend to desire neutral colors that can be used with a variety of different building colors but still look aesthetically pleasing. Optionally, it also would be desirable if such a coating blocked at least some of the solar ultraviolet (UV) radiation directed toward the coating. Solar UV radiation can damage furniture and can cause fading. Optionally, it also would be desirable for such a coating to block at least some of the long wavelength solar IR energy.

SUMMARY OF THE INVENTION

A low emissivity coating comprises a plurality of phase adjustment layers; a first metal functional layer; and a second metal functional layer located over and spaced from the first metal functional layer, wherein the low emissivity coating provides a reference IGU summer/day SHGC of at least 0.4 and a reference IGU winter/night U factor of no greater than 0.4 British Thermal Unit/hour-foot squared-degree Fahrenheit (BTU/hr-ft$^2$-° F.) (2.27 Watt/meter squared-degree Kelvin (W/m2K)).

The ratio of the geometric thickness of the first metal functional layer divided by the geometric thickness of the second metal functional layer is in the range of 0.6 to 2, such as in the range of 0.6 to 1.

An IGU comprises a substrate having the low emissivity coating.

BRIEF DESCRIPTION OF THE DRAWINGS

The Invention will be described with reference to the following drawing figures wherein like reference numbers identify like parts throughout.

DESCRIPTION OF THE PREFERRED EMBODIMENTS

Figure 1:
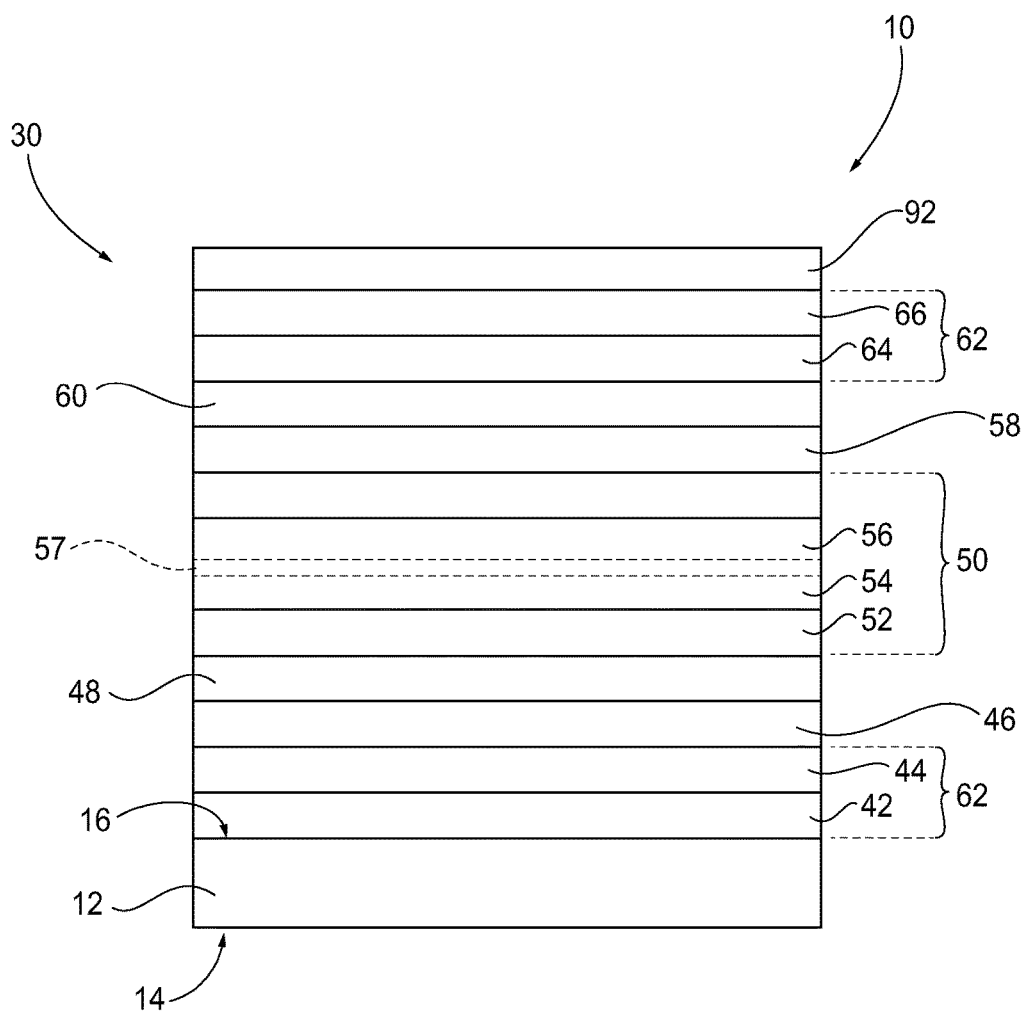
FIG. 1 is a side view (not to scale) of a coated article in the form of a monolithic transparency having a low emissivity coating of the invention.

Spatial or directional terms, such as "left", "right", "inner", "outer", "above", "below", and the like, relate to the invention as it is shown in the drawing figures. However, the invention can assume various alternative orientations and, accordingly, such terms are not to be considered as limiting.

All numbers used in the specification and claims are to be understood as being modified in all instances by the term "about". By "about" is meant a range of plus or minus ten percent of the stated value.

All ranges disclosed herein encompass the beginning and ending range values and any and all subranges subsumed therein. The ranges disclosed herein represent the average values over the specified range.

With respect to coating layers or films, the term "over" means farther from the substrate (or base layer) on which the coating layer or film under discussion is located. For example, a second layer located "over" a first layer means that the second layer is located farther from the substrate (or base layer) than is the first layer. The second layer can be in direct contact with the first layer. Alternatively, one or more other layers can be located between the first layer and the second layer.

The term "film" means a region having a chemically distinct or homogeneous composition or mixture of materials. A "layer" comprises one or more "films". A "coating" comprises one or more "layers".

The terms "polymer" or "polymeric" include oligomers, homopolymers, copolymers, and terpolymers, e.g., polymers formed from two or more types of monomers or polymers.

The term "ultraviolet radiation" means electromagnetic radiation having a wavelength in the range of 100 nm to less than 380 nm. The terms "visible radiation" or "visible light" mean electromagnetic radiation having a wavelength in the range of 380 nm to 780 nm. The term "infrared radiation" means electromagnetic radiation having a wavelength in the range of greater than 780 nm to 100,000 nm. The term "solar infrared radiation" means electromagnetic radiation having a wavelength in the range of 1,000 nm to 3,000 nm. The term "thermal infrared radiation" means electromagnetic radiation having a wavelength in the range of greater than 3,000 nm to 100,000 nm.

All documents referred to herein are "incorporated by reference" in their entirety.

The term "optical thickness" means the geometric thickness of the material multiplied by the refractive index of the material at a reference wavelength of 550 nm. For example, a material having a geometric thickness of 5 nm and a refractive index of 2 at a reference wavelength of 550 nm would have an optical thickness of 10 nm.

The terms "tempered" or "heat-treated" mean that the article or coating under discussion has been or is capable of being heated to a temperature sufficient to achieve thermal tempering, heat bending, or heat-strengthening. This definition includes, for example, heating the article in an oven or furnace at a temperature of at least 580° C., such as at least 600° C., such as at least 620° C., for a period of time to achieve thermal tempering, heat bending, or heat strengthening. For example, heating the article for a period of time in the range of 1 to 15 minutes, such as 1 to 5 minutes.

The term "temperable" means that the article or coating under discussion is designed to be tempered for final use.

The terms "non-tempered" and "non-heat-treated" mean not tempered or heat-treated, or not designed to be tempered or heat-treated for final use.

The terms "metal" and "metal oxide" include silicon and silica, respectively, as well as traditionally recognized metals and metal oxides, even though silicon conventionally may not be considered a metal.

By "at least" is meant "greater than or equal to". By "not greater than" is meant "less than or equal to".

Any reference to amounts, unless otherwise specified, is "by weight percent".

Thickness values, unless indicated to the contrary, are geometric thickness values.

A "dopant" is a material that can be present in an amount up to 10 wt. %, such as up to 5 wt. %, such as up to wt. %, such as up to 2 wt. %. For example, up to 1 wt. %. For example, up to 0.5 wt. %. For example, up to 0.1 wt. %.

The term "includes" is synonymous with "comprises".

The term "curable" means a material capable of polymerizing or crosslinking. By "cured" is meant that the material is at least partly polymerized or cross-linked, preferably fully polymerized or cross-linked.

The LSG (light to solar gain) ratio is the transmittance of visible light divided by the SHGC.

A "reference IGU" is defined as an IGU having two spaced apart 3 mm pieces of CLEAR glass separated by a gap of 0.5 inch (1.2 mm) filled with air, with the coating on the No. 3 surface. By "reference IGU value" is meant the reported value for the coating in a reference IGU.

A "reference laminated unit" is defined as having two plies of 2.1 mm clear glass connected by a 0.76 mm interlayer of polyvinyl butyral and with the coating on the No. 2 surface. A reference laminated unit value means the reported value when the coating is incorporated into a reference laminated unit on the No. 2 surface.

The term "solar control coating" refers to a coating comprised of one or more layers or films that affect the solar properties of the coated article, such as the amount of solar radiation reflected from, absorbed by, or transmitted through the coating.

Optical and solar control performance values (e.g., visible light transmittance and/or haze), unless indicated to the contrary, are those determined using a Perkin Elmer 1050 Spectrophotometer. Reference IGU values, unless indicated to the contrary, are those determined in accordance with OPTICS (v6.0) software and WINDOW (v7.3.4.0) software available from Lawrence Berkeley National Laboratory, measured center of glazing (COG), calculated according to NFRC 2010 (which includes NFRC 100-2010) standard default settings.

U factors, unless indicated to the contrary, are winter/night U factors. U factors, unless indicated to the contrary, are reported in units of BTU/hr-ft$^2$-° F.

SHGC values, unless indicated to the contrary, are summer/day values.

Sheet resistance values, unless indicated to the contrary, are those determined using a four-point probe (e.g., Nagy Instruments SD-600 measurement device or Alessi four-point probe). Surface roughness values are those determined using an Instrument Dimension 3100 Atomic Force Microscope.

Color values (e.g., L*, a*, b*, C*, and hue°) are in accordance with the 1976 CIELAB color system specified by the International Commission on Illumination.

The L*, a*, and b* values in the specification and claims represent color center point values. A reference IGU or reference laminated unit incorporating the solar control coating of the invention within normal manufacturing variation should have a ΔEcmc color difference, relative to the center point value, of less than 4 CMC units (i.e., ΔEcmc<4), preferably less than 2 CMC units (i.e., ΔEcmc<2).

The discussion of the invention may describe certain features as being "particularly" or "preferably" within certain limitations (e.g., "preferably", "more preferably", or "even more preferably", within certain limitations). It is to be understood that the invention is not limited to these particular or preferred limitations but encompasses the entire scope of the disclosure.

The invention comprises, consists of, or consists essentially of, the following aspects of the invention, in any combination. Various aspects of the invention are illustrated in separate drawing figures. However, it is to be understood that this is simply for ease of illustration and discussion. In the practice of the invention, one or more aspects of the invention shown in one drawing figure can be combined with one or more aspects of the invention shown in one or more of the other drawing figures.

The invention will be discussed with reference to an architectural transparency. By "architectural transparency" is meant any transparency located on a building, such as a window, IGU, or a sky light. However, it is to be understood that the invention is not limited to use with architectural transparencies but could be practiced with transparencies in any desired field, such as laminated or non-laminated residential or commercial windows or transparencies for land, air, space, above water or underwater vehicles. Therefore, it is to be understood that the specifically disclosed examples are presented simply to explain the general concepts of the invention, and that the invention is not limited to these specific examples. Additionally, while a typical "transparency" can have sufficient visible light transmission such that materials can be viewed clearly through the transparency, in the practice of the invention, the "transparency" need not be transparent to visible light but may be translucent.

A coated article 10 in the form of a monolithic transparency incorporating features of the invention is illustrated in FIG. 1. The coated article 10 includes a substrate 12 having a first major surface 14 and an opposed second major surface 16.

A low emissivity coating 30 of the invention is located over at least a portion of at least one major surface of the substrate 12. In the example shown in FIG. 1, the low emissivity coating 30 is located over at least a portion of the second major surface 16 of the substrate 12. The low emissivity coating 30 comprises a first phase adjustment layer 40. A first metal functional layer 46 is located over the first phase adjustment layer 40. A first primer layer 48 is located over the first metal functional layer 46. A second phase adjustment layer 50 is located over the first metal functional layer 46 (e.g., over the first primer layer 48). A second metal functional layer 58 is located over the second phase adjustment layer 50. A second primer layer 60 is located over the second metal functional layer 58. A third phase adjustment layer 62 is located over the second metal functional layer 58 (e.g., over the second primer layer 60). A protective layer 92 is located over the third phase adjustment layer 62.

The substrate 12 can be transparent to visible radiation. By "transparent" is meant having visible radiation transmittance of greater than 0% up to 100%. Alternatively, the ply can be translucent. By "translucent" is meant diffusing visible radiation such that objects on the side opposite a viewer are not clearly visible. Examples of suitable materials include, but are not limited to, plastic substrates (such as acrylic polymers, such as polyacrylates; polyalkylmethacrylates, such as polymethylmethacrylates, polyethylmethacrylates, polypropylmethacrylates, and the like; polyurethanes; polycarbonates; polyalkylterephthalates, such as polyethyleneterephthalate (PET), polypropyleneterephthalates, polybutyleneterephthalates, and the like; polysiloxane-containing polymers; or copolymers of any monomers for preparing these, or any mixtures thereof); ceramic substrates; glass substrates; or mixtures or combinations of any of the above. For example, the substrate can comprise conventional soda-lime-silicate glass, borosilicate glass, or leaded glass. The glass can be clear glass. By "clear glass" is meant non-tinted or non-colored glass. Alternatively, the glass can be tinted or otherwise colored glass. The glass can be heat-treated glass or non-heat-treated glass. The glass can be of any type, such as conventional float glass, and can be of any composition having any optical properties, e.g., any value of visible radiation transmittance, ultraviolet radiation transmittance, infrared radiation transmittance, or total solar energy transmittance. By "float glass" is meant glass formed by a conventional float process in which molten glass is deposited onto a molten metal bath and controllably cooled to form a float glass ribbon.

The substrate 12 can be, for example, clear float glass or can be tinted or colored glass. The substrate 12 can be of any desired dimensions, e.g., length, width, shape, or thickness. Non-limiting examples of glass that can be used for the practice of the invention include clear glass, Starphire®, Solargreen®, Solextra®, GL-20®, GL-35™, Solarbronze®, Solargray® glass, Pacifica® glass, SolarBlue® glass, and Optiblue® glass, all commercially available from PPG Industries Inc. of Pittsburgh, Pa.

The phase adjustment layers 40, 50, 62 comprise nonmetallic materials. For example, the phase adjustment layers 40, 50, 62 can comprise dielectric or semiconductor materials. For example, the phase adjustment layers 40, 50, 62 can comprise oxides, nitrides, oxynitrides, borides, carbides, oxycarbides, borocarbides, boronitrides, carbonitrides, or mixtures, combinations, blends, or alloys thereof. Examples of suitable materials for the phase adjustment layers 40, 50, 62 include oxides, nitrides, or oxynitrides of titanium, hafnium, zirconium, niobium, zinc, bismuth, lead, indium, tin, silicon, aluminum, boron, and mixtures, combinations, blends, or alloys thereof. These can have small amounts of other materials. Examples include manganese in bismuth oxide, tin in indium oxide, etc. Additionally, oxides of metal alloys or metal mixtures can be used. Examples include oxides containing zinc and tin (e.g., zinc stannate), oxides of indium-tin alloys, silicon nitrides, silicon aluminum nitrides, or aluminum nitrides. Further, doped metal oxides, suboxides, nitrides, subnitrides, or oxynitrides can be used. Examples include antimony or indium doped tin oxides or nickel or boron doped silicon oxides. Particular examples of materials include zinc oxides, tin oxides, silicon nitrides, silicon-aluminum nitrides, silicon-nickel nitrides, silicon-chromium nitrides, antimony doped tin oxide, tin doped zinc oxide, aluminum doped zinc oxide, indium doped zinc oxide, titanium oxide, or mixtures, combinations, blends, or alloys thereof.

The phase adjustment layers 40, 50, 62 can comprise a single material. Alternatively, the phase adjustment layers 40, 50, 62 can comprise multiple materials and/or multiple films. The phase adjustment layers 40, 50, 62 can comprise a stratified sequence of films of chemically distinct materials or phases or may comprise one or more composites of one or more chemically distinct materials or phases. The different phase adjustment layers 40, 50, 62 can comprise the same or different materials. The phase adjustment layers 40, 50, 62 can have the same or different thicknesses.

The phase adjustment layers 40, 50, 62 allow adjustment of the constructive and destructive optical interference of electromagnetic radiation partially reflected from, or partially transmitted by, the various interface boundaries of the layers of the low emissivity coating 30. Varying the thicknesses and/or compositions of the phase adjustment layers 40, 50, 62 can change the overall reflectance, transmittance, and/or absorptance of the low emissivity coating 30, which can alter the solar control performance, thermal infrared insulating performance, color, and/or aesthetics of the low emissivity coating 30. Additionally, the phase adjustment layers 40, 50, 62 provide chemical and/or mechanical protection for other layers of the low emissivity coating 30, such as the metal functional layers.

The phase adjustment layers 40, 50, 62 can act as anti-reflectve layers to anti-reflect the metal functional layers to reduce the overall visible light reflectance and/or increase the visible light transmittance of the low emissivity coating 30. Materials having refractive indices around 2 are particularly useful for antireflection of metal functional layers.

In the illustrated exemplary coating 30, the first phase adjustment layer 40 is located over at least a portion of the second major surface 16 of the substrate 12. The first phase adjustment layer 40 can be a single layer or can comprise one or more films of antireflective materials or dielectric materials described above. The first phase adjustment layer 40 can be transparent to visible light. The first phase adjustment layer 40 may or may not exhibit minimal absorption in one or more regions of the electromagnetic spectrum, for example, visible light.

The first phase adjustment layer 40 can comprise a metal oxide, a mixture of metal oxides, or a metal alloy oxide. For example, the first phase adjustment layer 40 can comprise doped or non-doped oxides of zinc and tin.

The first phase adjustment layer 40 can have an optical thickness in the range of 75 nm to 112 nm. For example, an optical thickness in the range of 84 nm to 103 nm. For example, an optical thickness in the range of 89 nm to 99 nm. For example, an optical thickness in the range of 93 nm to 95 nm.

The first phase adjustment layer 40 can have a geometric thickness in the range of 36 nm to 56 nm. For example, a geometric thickness in the range of 42 nm to 52 nm. For example, a geometric thickness in the range of 42 nm to 49 nm. For example, a geometric thickness in the range of 44 nm to 48 nm.

In an exemplary tempered coating 30, the first phase adjustment layer 40 can have an optical thickness in the range of 75 nm to 112 nm. For example, an optical thickness in the range of 84 nm to 103 nm. For example, an optical thickness in the range of 89 nm to 99 nm. For example, an optical thickness in the range of 93 nm to 95 nm.

In an exemplary tempered coating 30, the first phase adjustment layer 40 can have a geometric thickness in the range of 37 nm to 56 nm. For example, a geometric thickness in the range of 42 nm to 52 nm. For example, a geometric thickness in the range of 44 nm to 49 nm. For example, a geometric thickness in the range of 46 nm to 48 nm.

In an exemplary non-tempered coating 30, the first phase adjustment layer 40 can have an optical thickness in the range of 72 nm to 108 nm. For example, an optical thickness in the range of 81 nm to 99 nm. For example, an optical thickness in the range of 85 nm to 94 nm. For example, an optical thickness in the range of 89 nm to 91 nm.

In an exemplary non-tempered coating 30, the first phase adjustment layer 40 can have a geometric thickness in the range of 36 nm to 54 nm. For example, a geometric thickness in the range of 40 nm to 50 nm. For example, a geometric thickness in the range of 42 nm to 47 nm. For example, a geometric thickness in the range of 44 nm to 46 nm.

The first phase adjustment layer 40 can comprise a multi-film structure having a first film 42 and a second film 44. The second film 44 can be located over the first film 42.

The first film 42 can be an oxide of a metal alloy or a mixture of metal oxides. For example, the first film 42 can be an oxide of an alloy or mixture of zinc and tin. By "an alloy of zinc and tin" is meant true alloys and also mixtures. The oxide of an alloy of zinc and tin can be that obtained from magnetron sputtering vacuum deposition from a cathode of zinc and tin. The cathode can comprise zinc and tin in proportions of 5 wt. % to 95 wt % zinc and 95 wt. % to 5 wt. % tin, such as 10 wt. % to 90 wt. % zinc and 90 wt. % to 10 wt. % tin. However, other ratios of zinc to tin could also be used. An exemplary metal alloy oxide for the first film 42 can be written as $Zn_xSn_{1-x}O_{2-x}$ (Formula 1) where "x" varies in the range of greater than 0 to less than 1. For instance, "x" can be greater than 0 and can be any fraction or decimal between greater than 0 to less than 1. The stoichiometric form of Formula 1 is "$Zn_2SnO_4$", commonly referred to as zinc stannate. A zinc stannate layer can be sputter deposited from a cathode having 52 wt. % zinc and 48 wt. % tin in the presence of oxygen. For example, the first film 42 can comprise zinc stannate.

A doped zinc oxide can be deposited from a zinc cathode that includes another material to improve the sputtering characteristics of the cathode. For example, the zinc cathode can include a small amount of tin (e.g., up to 10 wt. %, such as up to 5 wt. %) to improve sputtering. In which case, the resultant zinc oxide film would include a small percentage of tin oxide, e.g., up to 10 wt. % tin oxide, e.g., up to 5 wt. % tin oxide. Examples of the other materials include aluminum, indium, and combinations thereof. Preferably, the other material comprises tin. A tin doped zinc oxide material deposited from a cathode comprising 90 wt. % zinc and 10 wt. % tin, in the presence of oxygen, is referred to herein as ZnO 90/10.

The second film 44 can comprise a metal oxide, a doped metal oxide, or a mixture of metal oxides. For example, the second film 44 can comprise zinc oxide or doped zinc oxide. For example, the second film 44 can comprise tin doped zinc oxide. For example, the second film 44 can comprise ZnO 90/10.

The second film 44 can have a geometric thickness in the range of 1 nm to 20 nm. For example, a geometric thickness in the range of 5 nm to 15 nm.

The first film 42 can have a geometric thickness in the range of 24 nm to 46 nm. For example, a geometric thickness in the range of 30 nm to 42 nm.

In an exemplary tempered coating 30, the second film 44 can have a geometric thickness in the range of 1 nm to 20 nm. For example, a geometric thickness in the range of 5 nm to 15 nm.

In an exemplary tempered coating 30, the first film 42 can have a geometric thickness in the range of 26 nm to 46 nm. For example, a geometric thickness in the range of 32 nm to 42 nm.

In an exemplary non-tempered coating 30, the second film 44 can have a geometric thickness in the range of 1 nm to 20 nm. For example, a geometric thickness in the range of 5 nm to 15 nm.

In an exemplary non-tempered coating 30, the first film 42 can have a geometric thickness in the range of 24 nm to 44 nm. For example, a geometric thickness in the range of 30 nm to 40 nm.

The metal functional layers 46, 58 provide reflectance of electromagnetic radiation in at least a portion of the infrared radiation region of the electromagnetic spectrum, for example, in the solar infrared radiation region or the thermal infrared radiation region of the electromagnetic spectrum. The coating 30 can have two metal functional layers. Alternatively, the coating 30 can have more than two metal functional layers.

Examples of materials useful for the metal functional layers 46, 58 include noble or near noble metals. Examples of such metals include silver, gold, platinum, palladium, osmium, iridium, rhodium, ruthenium, copper, mercury, rhenium, aluminum, and combinations thereof. For example, one or more of the metal functional layers 46, 58 can comprise metallic silver.

The first metal functional layer 46 can comprise any of the above metals. For example, the first metal functional layer 46 can comprise silver.

The first metal functional layer 46 can be a continuous layer. For example, the first metal functional layer 46 can have a geometric thickness in the range of 5 nm to 8.5 nm. For example, a geometric thickness in the range of 6.5 nm to 7.5 nm. For example, a geometric thickness in the range of 6.6 nm to 7.3 nm.

In an exemplary tempered coating 30, the first metal functional layer 48 can have a geometric thickness in the range of 5 nm to 8 nm. For example, a geometric thickness in the range of 6 nm to 7.5 nm. For example, a geometric thickness in the range of 6.5 nm to 7 nm. For example, a geometric thickness in the range of 6.6 nm to 6.8 nm.

In an exemplary non-tempered coating 30, the first metal functional layer 46 can have a geometric thickness in the range of 5.5 nm to 8.5 nm. For example, a geometric thickness in the range of 6.5 nm to 8 nm. For example, a geometric thickness in the range of 6.8 nm to 7.5 nm. For example, a geometric thickness in the range of 7 nm to 7.3 nm.

The primer layers 48, 60 can be located in direct contact with the associated underlying metal functional layer 46, 58. The primer layers 48, 60 protect the associated metal functional layer 46, 58 during the coating process or subsequent processing, such as thermal tempering. The primer material is deposited as a metal. During subsequent processing, such as the deposition of the overlying phase adjustment layer or thermal tempering, some or all of the metal primer material oxidizes. When oxide or nitride materials are used in the phase adjustment layers, the primer layers 48, 60 can comprise oxophillic or nitrophillic materials, respectively. The primer layers 48, 60 need not be all the same material. The primer layers 48, 60 need not be of the same thickness.

Examples of materials useful for the primer layers 48, 60 include titanium, niobium, tungsten, nickel, chromium, iron, tantalum, zirconium, aluminum, silicon, indium, tin, zinc, molybdenum, hafnium, bismuth, vanadium, manganese, and combinations thereof. Preferably, the primer layers 48, 60 comprise titanium.

The first primer layer 48 is located over the first metal functional layer 46. The first primer layer 48 can be a single film or a multiple film layer. The first primer layer 48 can comprise any of the materials described above. For example, the first primer layer 48 can comprise titanium.

The first primer layer 48 can have a geometric thickness in the range of 1.5 nm to 3.6 nm. For example, a geometric thickness in the range of 1.8 nm to 3.2 nm. For example, a geometric thickness in the range of 1.9 nm to 3.1 nm.

In an exemplary tempered coating, the first primer layer 48 can have a geometric thickness in the range of 2.5 nm to 3.6 nm. For example, a geometric thickness in the range of 2.7 nm to 3.3 nm. For example, a geometric thickness in the range of 2.8 nm to 3.2 nm. For example, a geometric thickness in the range of 2.9 nm to 3.1 nm.

In an exemplary non-tempered coating, the first primer layer 48 can have a geometric thickness in the range of 1.5 nm to 2.5 nm. For example, a geometric thickness in the range of 1.7 nm to 2.3 nm. For example, a geometric thickness in the range of 1.8 nm to 2.2 nm. For example, a geometric thickness in the range of 1.9 nm to 2.1 nm.

The second phase adjustment layer 50 can comprise any of the materials described above for the phase adjustment layers.

The second phase adjustment layer 50 can have an optical thickness in the range of 136 nm to 204 nm. For example, an optical thickness in the range of 155 nm to 178 nm. For example, an optical thickness in the range of 162 nm to 172 nm.

The second phase adjustment layer 50 can have a geometric thickness in the range of 65 nm to 102 nm. For example, a geometric thickness in the range of 77 nm to 89 nm. For example, a geometric thickness in the range of 81 nm to 86 nm.

In an exemplary tempered coating, the second phase adjustment layer 50 can have an optical thickness in the range of 136 nm to 204 nm. For example, an optical thickness in the range of 153 nm to 187 nm. For example, an optical thickness in the range of 161 nm to 178 nm. For example, an optical thickness in the range of 168 nm to 172 nm.

In an exemplary tempered coating, the second phase adjustment layer 50 can have a geometric thickness in the range of 68 nm to 102 nm. For example, a geometric thickness in the range of 76 nm to 94 nm. For example, a geometric thickness in the range of 80 nm to 89 nm. For example, a geometric thickness in the range of 84 nm to 86 nm.

In an exemplary non-tempered coating, the second phase adjustment layer 50 can have an optical thickness in the range of 147 nm to 181 nm. For example, an optical thickness in the range of 155 nm to 172 nm. For example, an optical thickness in the range of 162 nm to 166 nm.

In an exemplary non-tempered coating, the second phase adjustment layer 50 can have a geometric thickness in the range of 65 nm to 98 nm. For example, a geometric thickness in the range of 73 nm to 90 nm. For example, a geometric thickness in the range of 77 nm to 86 nm. For example, a geometric thickness in the range of 81 nm to 83 nm.

The second phase adjustment layer 50 can be a single layer or a multilayer structure. For example, the second phase adjustment layer 50 can include a first film 52, a second film 54, a third film 56, and optionally a fourth film 57.

The first film 52 and/or the third film 56 and/or the optional fourth film 57 can comprise a metal oxide film or a doped metal oxide film. For example, a zinc oxide film or a tin doped zinc oxide film, such as ZnO 90/10.

The second film 54 can comprise a metal alloy oxide film. For example, the second film 54 can comprise a zinc stannate film. If the optional fourth film 57 is present, the second film 54 can be deposited in two or more deposition steps, with the fourth film 57 deposited between two of the deposition steps for the second film 54.

The first film 52 and/or the third film 56 and/or the optional fourth film 57 can have a geometric thickness in the range of 1 nm to 20 nm. For example, a geometric thickness in the range of 5 nm to 15 nm.

The second film 54 can have a geometric thickness in the range of 62 nm to 84 nm. For example, a geometric thickness in the range of 72 nm to 85 nm.

In an exemplary tempered coating 30, the first film 52 and/or the third film 56 and/or the optional fourth film 57 can have a geometric thickness in the range of 1 nm to 20 nm. For example, a geometric thickness in the range of 5 nm to 15 nm.

In an exemplary tempered coating 30, the second film 54 can have a geometric thickness in the range of 65 nm to 84 nm. For example, a geometric thickness in the range of 75 nm to 85 nm.

In an exemplary non-tempered coating 30, the first film 52 and/or the third film 56 and/or the optional fourth film 57 can have a geometric thickness in the range of 1 nm to 20 nm. For example, a geometric thickness in the range of 5 nm to 15 nm.

In an exemplary non-tempered coating 30, the second film 54 can have a geometric thickness in the range of 62 nm to 81 nm. For example, a geometric thickness in the range of 72 nm to 77 nm.

The second metal functional layer 58 is located over the second phase adjustment layer 50 (e.g., over the third film 56).

The second metal functional layer 58 can be a continuous layer. The second metal functional layer 58 can comprise any of the materials described above for the metal functional layers. For example, the second metal functional layer 58 can comprise silver.

The second metal functional layer 58 can have a geometric thickness in the range of 7 nm to 11 nm. For example, a geometric thickness in the range of 8 nm to 10 nm. For example, a geometric thickness in the range of 8.3 nm to 9.5 nm. For example, a geometric thickness in the range of 8.7 nm to 9.2 nm.

In an exemplary tempered coating 30, the second metal functional layer 58 can have a geometric thickness in the range of 7 nm to 11 nm. For example, a geometric thickness in the range of 8 nm to 10 nm. For example, a geometric thickness in the range of 8.5 nm to 9.5 nm. For example, a geometric thickness in the range of 9 nm to 9.2 nm.

In an exemplary non-tempered coating 30, the second metal functional layer 58 can have a geometric thickness in the range of 7 nm to 11 nm. For example, a geometric thickness in the range of 8 nm to 10 nm. For example, a geometric thickness in the range of 8.3 nm to 9.5 nm. For example, a geometric thickness in the range of 8.7 nm to 8.9 nm.

The second primer layer 60 can be of any of the materials and/or thicknesses as described above with respect to the first primer layer 48. For example, the second primer 60 can comprise titanium.

The second primer layer 60 can have a geometric thickness in the range of 1.5 nm to 3.6 nm. For example, a geometric thickness in the range of 1.8 nm to 3.2 nm. For example, a geometric thickness in the range of 1.9 nm to 3.1 nm.

In an exemplary tempered coating, the second primer layer 60 can have a geometric thickness in the range of 2.5 nm to 3.6 nm. For example, a geometric thickness in the range of 2.7 nm to 3.3 nm. For example, a geometric thickness in the range of 2.8 nm to 3.2 nm. For example, a geometric thickness in the range of 2.9 nm to 3.1 nm.

In an exemplary non-tempered coating, the second primer layer 60 can have a geometric thickness in the range of 1.5 nm to 2.5 nm. For example, a geometric thickness in the range of 1.7 nm to 2.3 nm. For example, a geometric thickness in the range of 1.8 nm to 2.2 nm. For example, a geometric thickness in the range of 1.9 nm to 2.1 nm.

The third phase adjustment layer 62 can include any of the materials and/or layers as discussed above with respect to the first and second phase adjustment layers 40, 50. For example, the third phase adjustment layer 62 can be a multi-film structure.

The third phase adjustment layer 62 can have an optical thickness in the range of 46 nm to 73 nm. For example, an optical thickness in the range of 55 nm to 68 nm. For example, an optical thickness in the range of 57 nm to 67 nm.

The third phase adjustment layer 62 can have a geometric thickness in the range of 23 nm to 40 nm. For example, a geometric thickness in the range of 27 nm to 35 nm. For example, a geometric thickness in the range of 28 nm to 34 nm.

In an exemplary tempered coating 30, the third phase adjustment layer 62 can have an optical thickness in the range of 46 nm to 70 nm. For example, an optical thickness in the range of 52 nm to 64 nm. For example, an optical thickness in the range of 55 nm to 61 nm. For example, an optical thickness in the range of 57 nm to 59 nm.

In an exemplary tempered coating 30, the third phase adjustment layer 62 can have a geometric thickness in the range of 23 nm to 35 nm. For example, a geometric thickness in the range of 26 nm to 32 nm. For example, a geometric thickness in the range of 27 nm to 31 nm. For example, a geometric thickness in the range of 28 nm to 30 nm.

In an exemplary non-tempered coating 30, the third phase adjustment layer 62 can have an optical thickness in the range of 59 nm to 73 nm. For example, an optical thickness in the range of 62 nm to 68 nm. For example, an optical thickness in the range of 65 nm to 67 nm.

In an exemplary non-tempered coating 30, the third phase adjustment layer 62 can have a geometric thickness in the range of 26 nm to 40 nm. For example, a geometric thickness in the range of 29 nm to 36 nm. For example, a geometric thickness in the range of 31 nm to 35 nm. For example, a geometric thickness in the range of 32 nm to 34 nm.

For example, the third phase adjustment layer 62 can include a first film 64 and a second film 66.

The first film 64 can comprise a metal oxide material. For example, a zinc oxide or doped zinc oxide material. For example, tin doped zinc oxide. For example, ZnO 90/10. The second film 66 can comprise a metal alloy oxide material. For example, zinc stannate.

The first film 64 can have a geometric thickness in the range of 1 nm to 20 nm. For example, a geometric thickness in the range of 5 nm to 15 nm.

The second film 66 can have a geometric thickness in the range of 9 nm to 32 nm. For example, a geometric thickness in the range of 14 nm to 28 nm.

In an exemplary tempered coating 30, the first film 64 can have a geometric thickness in the range of 1 nm to 20 nm. For example, a geometric thickness in the range of 5 nm to 15 nm.

In an exemplary tempered coating 30, the second film 66 can have a geometric thickness in the range of 9 nm to 28 nm. For example, a geometric thickness in the range of 14 nm to 24 nm.

In an exemplary non-tempered coating 30, the first film 64 can have a geometric thickness in the range of 1 nm to 20 nm. For example, a geometric thickness in the range of 5 nm to 15 nm.

In an exemplary non-tempered coating 30, the second film 66 can have a geometric in the range of 13 nm to 32 nm. For example, a geometric thickness in the range of 18 nm to 28 nm.

The protective layer 92 can be the terminal layer of the low emissivity coating 30. The protective layer 92 can comprise one or more nonmetallic materials, such as those described above with regard to the phase adjustment layers. Alternatively, the protective layer 92 can comprise a metal material. The protective layer 92 can provide chemical and/or mechanical protection to the underlying coating layers.

For example, the protective layer 92 can be a metal oxide or metal nitride layer. For example, the protective layer 92 can comprise titania.

The protective layer 92 can have a geometric thickness in the range of 1 nm to 10 nm. For example, a geometric thickness in the range of 4 nm to 5.5 nm. For example, a geometric thickness in the range of 4.3 nm to 5.25 nm. For example, a geometric thickness in the range of 4.4 nm to 5.05 nm.

In an exemplary tempered coating 30, the protective layer 92 can have a geometric thickness in the range of 4.5 nm to 5.5 nm. For example, a geometric thickness in the range of 1 nm to 10 nm. For example, a geometric thickness in the range of 2 nm to 8 nm. For example, a geometric thickness in the range of 4.75 nm to 5.25 nm. For example, a geometric thickness in the range of 4.95 nm to 5.05 nm.

In an exemplary non-tempered coating 30, the protective layer 92 can have a geometric thickness in the range of 4 nm to 5 nm. For example, a geometric thickness in the range of 4.3 nm to 4.7 nm. For example, a geometric thickness in the range of 4.4 nm to 4.6 nm.

The second metal functional layer 58 is thicker than the first metal functional layer 46. The ratio of the geometric thickness of the first metal functional layer 46 divided by the geometric thickness of the second metal functional layer 58 is greater than 0.5. For example, greater than or equal to 0.6. For example, in the range of greater than 0.5 to 2, such as 0.6 to 1.5. For example, in the range of 0.6 to 1.

For a tempered coating 30, the ratio of the geometric thickness of the first metal functional layer 46 divided by the geometric thickness of the second metal functional layer 58 is in the range of 0.6 to 1, such as 0.6 to 0.9. For example, in the range of 0.7 to 0.8. For example, in the range of 0.72 to 0.76.

For an non-tempered coating 30, the ratio of the geometric thickness of the first metal functional layer 48 divided by the geometric thickness of the second metal functional layer 58 is in the range of 0.6 to 1, such as 0.67 to 1. For example, in the range of 0.75 to 0.85. For example, in the range of 0.8 to 0.84.

The low emissivity coating 30 can be deposited by any conventional method. Examples of such methods include conventional chemical vapor deposition (CVD) and geometric vapor deposition (PVD) methods. Examples of CVD processes include spray pyrolysis. Examples of PVD processes include electron beam evaporation and vacuum sputtering (such as magnetron sputter vapor deposition (MSVD)). Other coating methods could also be used, such as, but not limited to, sol-gel deposition. In one non-limiting embodiment, the coating 30 can be deposited by MSVD.

The low emissivity coating 30 has an emissivity in the range of 0.035 to 0.065. For example, in the range of 0.04 to 0.06.

The low emissivity coating 30 provides a reference IGU SHGC in the range of 0.4 to 0.65. For example, in the range of 0.45 to 0.62. For example, in the range of 0.5 to 0.6. For example, in the range of 0.55 to 0.59.

An exemplary tempered coating 30 provides a reference IGU SHGC in the range of 0.55 to 0.585. For example, in the range of 0.57 to 0.58.

An exemplary non-tempered coating 30 provides a reference IGU SHGC in the range of 0.56 to 0.57. For example, in the range of 0.562 to 0.566.

The low emissivity coating 30 provides a reference IGU Winter/night U factor in the range of 0.2 to 0.4 BTU/hr-ft$^2$-° F. (1.14 to 2.27 W/m2-K). For example, in the range of 0.22 to 0.35 BTU/hr-ft$^2$-° F. (1.25 to 1.99 W/m2-K). For example, in the range of 0.23 to 0.31 BTU/hr-ft-° F. (1.31 to 1.76 W/m2-K). For example, in the range of 0.24 to 0.30 BTU/hr-ft-° F. (1.36 to 1.70 W/m2-K).

An exemplary tempered coating 30 provides a reference IGU Winter/night U factor in the range of 0.28 to 0.32 BTU/hr-ft$^2$-° F. (1.6 to 1.8 W/m2-K). For example, in the range of 0.29 to 0.30 BTU/hr-ft-F (1.66 to 1.68 W/m2-K).

An exemplary non-tempered coating 30 can provide a reference IGU Winter/night U factor in the range of 0.299 to 0.320 BTU/hr-ft$^2$-° F. (1.7 to 1.82 W/m2-K. For example, in the range of 0.301 to 0.308 BTU/hr-ft$^2$-° F. (1.71 to 1.75 W/m2-K).

The low emissivity coating 30 provides a reference IGU exterior visible reflectance in the range of 5 to 20 percent. For example, in the range of 7 to 18 percent. For example, in the range of 10 to 15 percent. For example, in the range of 11 to 13 percent. For example, in the range of 12 to 13 percent.

The low emissivity coating 30 provides a reference IGU visible light transmittance in the range of 60 to 95 percent. For example, in the range of 65 to 85 percent. For example, in the range of 70 to 80 percent. For example, in the range of 72 to 768 percent. For example, in the range of 74 to 76 percent.

The low emissivity coating 30 provides a reference IGU transmitted L* in the range of 80 to 95. For example, in the range of 81 to 92. For example, in the range of 85 to 91. For example, in the range of 88 to 90. For example, in the range of 89 to 90 percent.

The low emissivity coating 30 provides a reference IGU transmitted a* in the range of 1 to −4. For example, in the range of 0 to −3. For example, in the range of −0.05 to −2.75. For example, in the range of −1 to −2.5.

The low emissivity coating 30 provides a reference IGU transmitted b* in the range of 3 to −1. For example, in the range of 0 to 2.5. For example, in the range of 0.5 to 2. For example, in the range of 0.7 to 1.5.

The low emissivity coating 30 provides a reference IGU exterior reflected L* in the range of 30 to 50. For example, in the range of 35 to 45. For example, in the range of 40 to 45. For example, in the range of 41 to 43.

The low emissivity coating 30 provides a reference IGU exterior reflected a* in the range of 3 to −3.5. For example, in the range of 0 to −3. For example, in the range of −1 to −2.75. For example, in the range of −1.5 to −2.7.

The low emissivity coating 30 provides a reference IGU exterior reflected b* in the range of 3 to −3. For example, in the range of 2 to −2. For example, in the range of 1 to −1. For example, in the range of 0.5 to −0.5.

Figure 2:
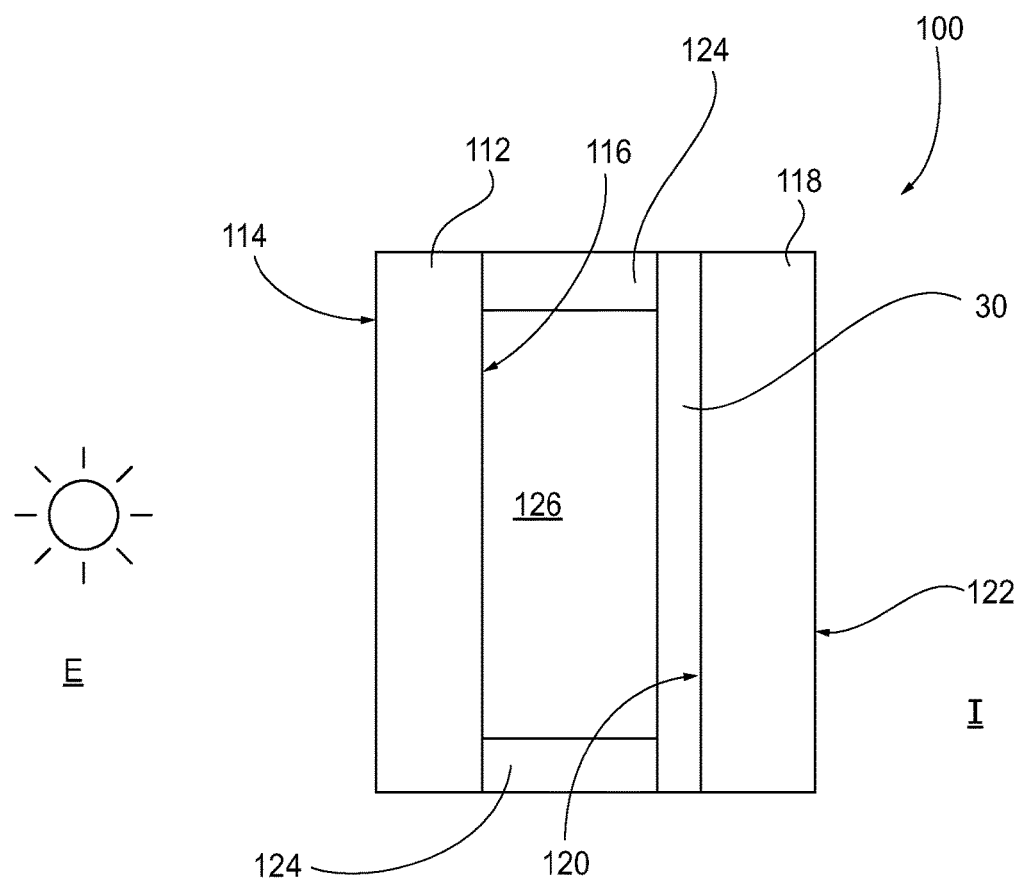
FIG. 2 is a side view (not to scale) of the coating of FIG. 1 incorporated into a double-glazed insulating glass unit (IGU).

FIG. 2 shows the coating 30 of FIG. 1 incorporated into a double glazed insulating glass unit (IGU) 100. The IGU 100 includes a first ply 112 having a first major surface 114 (No. 1 surface) facing the building exterior, i.e., is an outwardly facing major surface, and a second major surface 116 (No. 2 surface) facing the interior of the building, i.e., is an inwardly facing surface. The insulating glass unit 100 includes a second ply 118 having an outwardly facing major surface 120 (No. 3 surface) and an inwardly facing major surface 122 (No. 4 surface). The second ply 118 is spaced from the first ply 112. This numbering of the ply surfaces is in keeping with conventional practice in the fenestration art.

The first and second plies 112, 118 can be of any of the materials described above for the substrate 12. The second ply 118 can be the same as the first ply 112 or the second ply 118 can be different than the first ply 112. The first and second plies 112, 118 can each be, for example, clear float glass or can be tinted or colored glass or one ply 112, 118 can be clear glass and the other ply 112, 118 colored glass.

The first and second plies 112, 118 can be connected together in any suitable manner, such as by being adhesively bonded to a conventional spacer frame 124. A gap or chamber 126 is formed between the two plies 12, 118. The chamber 126 can be filled with a selected atmosphere, such as gas, for example air or a non-reactive gas, such as argon or krypton gas.

The low emissivity coating 30 can be located on any of the surfaces 114, 116, 120, or 122. In the illustrated example, the low emissivity coating 30 is located on the No. 3 surface 120.

Figure 3:
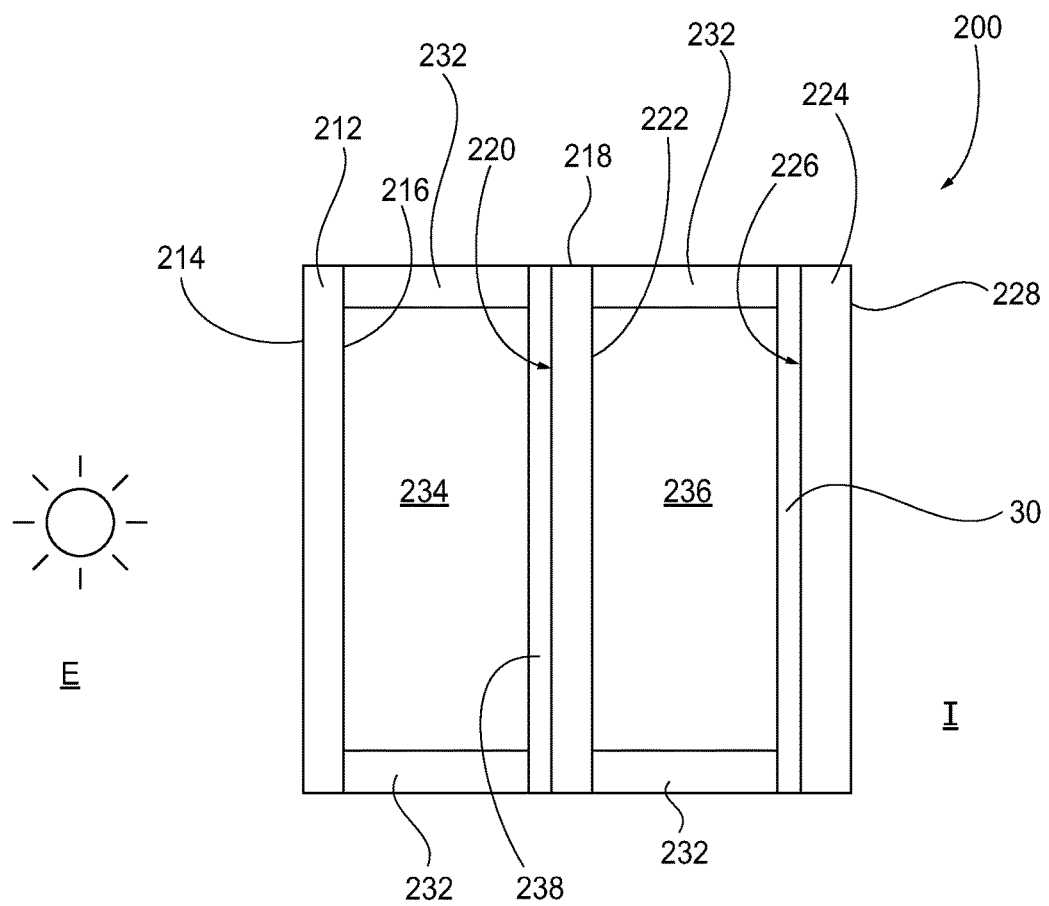
FIG. 3 is a side view (not to scale) of the coating of FIG. 1 incorporated into a triple-glazed insulating glass unit (IGU).

FIG. 3 shows the coating 30 of FIG. 1 incorporated into a triple glazed insulating glass unit (IGU) 200. The IGU 200 includes a first ply 212 having a first major surface 214 (No. 1 surface) facing the building exterior, i.e., is an outwardly facing major surface, and a second major surface 216 (No. 2 surface) facing the interior of the building, i.e., is an inwardly facing surface. The insulating glass unit 200 includes a second ply 218 having an outwardly facing major surface 220 (No. 3 surface) and an inwardly facing major surface 222 (No. 4 surface). The insulating glass unit 200 includes a third ply 224 having an outwardly facing major surface 226 (No. 5 surface) and an inwardly facing major surface 228 (No. 6 surface). The first ply 212, second ply 218, and third ply 224 are spaced from each other. This numbering of the ply surfaces is in keeping with conventional practice in the fenestration art.

The first, second, and third plies 212, 218, and 224 can be connected together in any suitable manner, such as by being adhesively bonded to a conventional spacer frame 232. A first gap or chamber 234 is defined between the first ply 212 and the second ply 218 and a second gap or chamber 236 is formed between the second ply 218 and the third ply 224. The chambers 234 and 236 can be filled with a selected atmosphere, such as gas, for example air or a non-reactive gas, such as argon or krypton gas.

The low emissivity coating 30 could be located on any of the surfaces 214, 216, 220, 222, 226, or 228. In the illustrated example, the low emissivity coating 30 is located on the No. 5 surface 226.

The first, second, and/or third plies 212, 218, 234 can be of any of the materials described above for the substrate 12. The plies can be the same or one or more plies can be different from the other ply or plies. The plies can each be, for example, clear float glass or can be tinted or colored glass, or one or more plies can be clear glass and the other one or more plies can be colored glass.

A second coating 238 can be located on one or more other surfaces of the glass plies. For example, the second coating 238 can be located on the No. 2 surface, 216, the No. 3 surface 220, or the No. 4 surface 222. Preferably, the second coating 238 is located on the No. 2 surface 216 or the No. 3 surface 220. More preferably, the second coating 238 is located on the No. 3 surface 220.

The second coating 238 can be the same as the first coating 30.

Alternatively, the second coating 238 can be different than the first coating 30. For example, the first coating 30 can have two metal functional layers and the second coating 238 can have only one metal functional layer. The second coating 238 can have a higher SHGC than the first coating 30. The second coating 238 can have a higher U factor than the first coating 30. An exemplary second coating 238 is a SUNGATE 400 coating, commercially available from PPG Industries, Inc.

EXAMPLES

Table 1 shows an exemplary tempered coating (Sample 1) and an exemplary non-tempered coating (Sample 2) of the invention. Each coating was formed on a piece of 3 mm CLEAR float glass. The reported thicknesses are geometric thicknesses in nm. The tin doped zinc oxide films in the Samples were deposited from a cathode containing 10 weight percent tin and 90 weight percent zinc (i.e., ZnO 90/10). "PAL" means Phase Adjustment Layer. Each first PAL was a tin doped zinc oxide film over a stannate film. The tin doped zinc oxide film had a geometric thickness in the range of 5 to 15 nm. Each second PAL was a layer of tin doped zinc oxide/zinc stannate/tin doped zinc oxide, with each tin doped zinc oxide film having a geometric thickness in the range of 5 to 15 nm. The third PAL was a zinc stannate film over a tin doped zinc oxide film, with the tin doped zinc oxide film having a geometric thickness in the range of 5 to 15 nm. The protective layer "PL" was titania. The primer layers were titania (deposited as a metal and at least partially oxidized by further processing steps. The reflective layers (IR#1 and IR#2) were metallic silver. Samples 1 and 2 were made on production coaters.

TABLE 1

| Sample | PAL #1 | IR #1 | Primer #1 | PAL #2 | IR #2 | Primer #2 | PAL #2 | PL |
|---|---|---|---|---|---|---|---|---|
| 1 | 47 | 6.7 | 3 | 85 | 9.1 | 3 | 29 | 5 |
| 2 | 45 | 7.2 | 2 | 82 | 8.8 | 2 | 33 | 4.5 |

Table 2 shows the measured optical data for Sample 1 using a Perkin Elmer Model 1050 In accordance with the instrument instructions. Table 3 shows the measured optical data for Sample 2 using a Perkin Elmer Model 1050 in accordance with the instrument instructions. "UV" is percent ultraviolet radiation in the range of 300 to 380 nm. "VIS" is visible radiation (illuminant D65, 2° observer). "IR" is percent infrared radiation in the range of 780 nm to 2500 nm. "Solar" is percent solar radiation in the range of 300 nm to 2500 nm (measured in accordance with ISO 9050 standard). The color parameters L*, a*, b*, C*, and hue° are values for illuminant D65, 10° observer.

TABLE 2

| | UV | VIS | IR | Solar | L* | a* | b* | C* | hue° |
|---|---|---|---|---|---|---|---|---|---|
| Transmittance | 22.70 | 83.40 | 29.45 | 56.81 | 93.17 | −0.32 | 0.66 | 0.73 | 115.57 |
| Front Reflectance | 29.43 | 5.29 | 54.04 | 26.94 | 27.49 | −4.23 | 2.41 | 4.87 | 150.32 |
| Rear Reflectance | 19.30 | 5.34 | 37.11 | 19.83 | 27.73 | 2.67 | −5.48 | 6.09 | 295.96 |

TABLE 3

| | UV | VIS | IR | Solar | L* | a* | b* | C* | hue° |
|---|---|---|---|---|---|---|---|---|---|
| Transmittance | 19.28 | 82.28 | 24.89 | 53.63 | 92.68 | −1.24 | 1.10 | 1.66 | 138.45 |
| Front Reflectance | 27.64 | 4.74 | 57.73 | 28.22 | 25.95 | −2.87 | 1.68 | 3.33 | 149.66 |
| Rear Reflectance | 16.53 | 5.15 | 39.71 | 20.7 | 27.21 | 3.17 | −5.31 | 6.18 | 300.87 |

Tables 4 and 5 show the reference IGU data for a reference IGU having two plies of 3 mm CLEAR float glass with a gap of 0.5 inch between the plies and with the coating on the No. 3 surface. The term "AIR" means the IGU was a reference IGU, i.e. the gap was filled with air. T(V) means percent visible radiation transmittance. RE(V) means percent exterior reflectance of visible radiation. RI(V) means percent interior reflectance of visible radiation. T(S) means percent solar radiation transmittance. RE(S) means percent exterior reflectance of solar radiation. RI(S) means percent interior reflectance of solar radiation. UV(T) means percent ultraviolet radiation transmittance. UF(W) means winter/night U factor (BTU/hr-ft$^2$-° F.). UF(S) means summer/day U factor (BTU/hr-ft$^2$-° F.). SC means shading coefficient SHGC means summer/day solar heat gain coefficient. LSG means light to solar gain ratio. L*(T), a*(T), and b*(T) mean the transmitted L*, a*, b*, L*(RE), a*(RE), and b*(RE) mean the reflected exterior L*, a*, b*.

TABLE 4

| Sample | Atm | T(V) | RE(V) | RI(V) | T(S) | RE(S) | RI(S) | UV(T) | UF(W) | UF(S) |
|---|---|---|---|---|---|---|---|---|---|---|
| 1 | Air | 75.3 | 12.9 | 11.4 | 46.4 | 27.5 | 25.2 | 20.4 | 0.296 | 0.277 |
| 2 | Air | 74.2 | 12.4 | 11.0 | 43.7 | 28.4 | 26.1 | 17.5 | 0.302 | 0.286 |

TABLE 5

| Sample | Atm | SC | SHGC | LSG | L*(T) | a*(T) | b*(T) | L*(RE) | a*(RE) | b*(RE) |
|---|---|---|---|---|---|---|---|---|---|---|
| 1 | Air | 0.665 | 0.579 | 1.30 | 89.51 | −1.31 | 0.78 | 42.59 | −2.61 | 0.35 |
| 2 | Air | 0.648 | 0.564 | 1.32 | 89.02 | −2.18 | 1.20 | 41.92 | −1.94 | −0.03 |

Tables 6 and 7 show the reference IGU data for a reference IGU having two plies of 3 mm CLEAR float glass with a gap of 0.5 inch between the plies and with the coating on the No. 3 surface. The term "AR90" means the IGU had ninety percent argon and ten percent air in the gap.

TABLE 6

| Sample | Atm | T(V) | RE(V) | RI(V) | T(S) | RE(S) | RI(S) | UV(T) | UF(W) | UF(S) |
|---|---|---|---|---|---|---|---|---|---|---|
| 1 | AR90 | 75.3 | 12.9 | 11.4 | 46.4 | 27.5 | 25.2 | 20.4 | 0.249 | 0.223 |
| 2 | AR90 | 74.2 | 12.4 | 11.0 | 43.7 | 28.4 | 26.1 | 17.5 | 0.256 | 0.233 |

TABLE 7

| Sample | Atm | SC | SHGC | LSG | L*(T) | a*(T) | b*(T) | L*(RE) | a*(RE) | b*(RE) |
|---|---|---|---|---|---|---|---|---|---|---|
| 1 | AR90 | 0.669 | 0.582 | 1.29 | 89.51 | −1.31 | 0.78 | 42.59 | −2.61 | 0.35 |
| 2 | AR90 | 0.652 | 0.568 | 1.31 | 89.02 | −2.18 | 1.20 | 41.92 | −1.94 | −0.03 |

The invention can be described further with reference to the following numbered clauses:

Clause 1: A low emissivity coating 30 comprises a plurality of phase adjustment layers 40, 50, 62; a first metal functional layer 46; and a second metal functional layer 58 located over and spaced from the first metal functional layer 46, wherein the low emissivity coating 30 provides a reference IGU summer/day SHGC of at least 0.4 and a reference IGU winter/night U factor of no greater than 0.4 BTU/hr-ft$^2$-° F.

Clause 2: The low emissivity coating 30 of clause 1, comprising a first phase adjustment layer 40; the first metal functional layer 46 located over the first phase adjustment layer 40; a first primer layer 48 located over the first metal functional layer 46; a second phase adjustment layer 50 located over the first primer layer 48; the second metal functional layer 58 located over the second phase adjustment layer 50; a second primer layer 60 located over the second metal functional layer 58; a third phase adjustment layer 62 located over the second primer layer 60; and a protective layer 92 located over the third phase adjustment layer 62.

Clause 3: The low emissivity coating 30 of clauses 1 or 2, wherein the phase adjustment layers 40, 50, 62 comprise nonmetallic layers.

Clause 4: The low emissivity coating 30 of any of clauses 1 to 3, wherein the phase adjustment layers 40, 50, 62 comprise dielectric or semiconductor materials.

Clause 5: The low emissivity coating 30 of any of clauses 1 to 4, wherein the phase adjustment layers 40, 50, 62 comprise oxides, nitrides, oxynitrides, or mixtures thereof.

Clause 6: The low emissivity coating 30 of any of clauses 1 to 5, wherein the phase adjustment layers 40, 50, 62 comprise oxides, nitrides, or oxynitrides of titanium, hafnium, zirconium, niobium, zinc, bismuth, lead, indium, tin, and mixtures thereof.

Clause 7: The low emissivity coating 30 of any of clauses 1 to 6, wherein the phase adjustment layers 40, 50, 62 comprise oxides of one or more metals, metal alloys, or metal mixtures, preferably oxides containing zinc and tin.

Clause 8: The low emissivity coating 30 of any of clauses 1 to 7, wherein the phase adjustment layers 40, 50, 62 comprise multiple films.

Clause 9: The low emissivity coating 30 of any of clauses 1 to 8, wherein the first phase adjustment layer 40 comprises an oxide of zinc and tin.

Clause 10: The low emissivity coating 30 of any of clauses 1 to 9, wherein the first phase adjustment layer 40 has an optical thickness in the range of 72 nm to 112 nm, preferably an optical thickness in the range of 84 nm to 103 nm, more preferably an optical thickness in the range of 89 nm to 95 nm.

Clause 11: The low emissivity coating 30 of any of clauses 1 to 10, wherein the first phase adjustment layer 40 has a geometric thickness in the range of 36 nm to 56 nm, preferably a geometric thickness in the range of 42 nm to 49 nm, more preferably a geometric thickness in the range of 44 nm to 48 nm.

Clause 12: The low emissivity coating 30 of any of clauses 1 to 11, wherein the first phase adjustment layer 40 comprises a first film 42 and a second film 44.

Clause 13: The low emissivity coating 30 of clause 12, wherein the first film 42 comprises a metal alloy oxide or mixture of metal oxides.

Clause 14: The low emissivity coating 30 of clauses 12 or 13, wherein the second film 44 comprises a metal oxide film, a doped metal oxide film, or an oxide mixture film.

Clause 15: The low emissivity coating 30 of any of clauses 12 to 14, wherein the first film 42 comprises zinc and tin, preferably a zinc/tin alloy oxide, more preferably zinc stannate.

Clause 16: The low emissivity coating 30 of any of clauses 12 to 15, wherein the second film 44 comprises a metal oxide, preferably a doped zinc oxide, more preferably tin doped zinc oxide. For example, ZnO 90/10.

Clause 17: The low emissivity coating 30 of any of clauses 12 to 16, wherein the second film 44 has a geometric thickness in the range of 1 nm to 20 nm, preferably a geometric thickness in the range of 5 nm to 15 nm.

Clause 18: The low emissivity coating 30 of any of clauses 12 to 17, wherein the first film 42 has a geometric thickness in the range of 24 nm to 46 nm, preferably a geometric thickness in the range of 30 nm to 42 nm.

Clause 19: The low emissivity coating 30 of any of clauses 1 to 18, wherein the metal functional layers 46, 58 comprise a material selected from the group consisting of silver, gold, platinum, palladium, osmium, iridium, rhodium, ruthenium, copper, mercury, rhenium, aluminum, and combinations thereof, preferably silver.

Clause 20: The low emissivity coating 30 of any of clauses 1 to 19, wherein the first metal functional layer 46 has a geometric thickness in the range of 5 nm to 8.5 nm, preferably a geometric thickness in the range of 6.5 nm to 7.5 nm, more preferably a geometric thickness in the range of 6.6 nm to 7.3 nm.

Clause 21: The low emissivity coating 30 of any of clauses 2 to 20, wherein the primer layers 48, 60 include a material selected from the group consisting of titanium, niobium, tungsten, nickel, chromium, iron, tantalum, zirconium, aluminum, silicon, indium, tin, zinc, molybdenum, hafnium, bismuth, vanadium, manganese, and combinations thereof, preferably titanium.

Clause 22: The low emissivity coating 30 of any of clauses 2 to 21, wherein the first primer layer 48 has a geometric thickness in the range of 1.5 nm to 3.6 nm, preferably a geometric thickness in the range of 1.8 nm to 3.2 nm, more preferably a geometric thickness in the range of 1.9 nm to 3.1 nm.

Clause 23: The low emissivity coating 30 of any of clauses 1 to 22, wherein the second phase adjustment layer 50 has an optical thickness in the range of 136 nm to 204 nm, preferably an optical thickness in the range of 155 nm to 178 nm, more preferably in the range of 162 nm to 172 nm.

Clause 24: The low emissivity coating 30 of any of clauses 1 to 23, wherein the second phase adjustment layer 50 has a geometric thickness in the range of 65 nm to 102 nm, preferably a geometric thickness in the range of 77 nm to 89 nm, more preferably a geometric thickness in the range of 81 nm to 86 nm.

Clause 25: The low emissivity coating 30 of any of clauses 1 to 24, wherein the second phase adjustment layer 50 comprises a first film 52, a second film 54, a third film 56, and optionally a fourth film 57.

Clause 26: The low emissivity coating 30 of clause 25, wherein the first film 52 and/or the third film 56 and/or the optional fourth film 57 comprises a metal oxide, preferably a doped metal oxide, more preferably tin doped zinc oxide. For example, ZnO 90/10.

Clause 27: The low emissivity coating 30 of clauses 25 or 26, wherein the second film 54 comprises a metal alloy oxide, preferably stannate.

Clause 28: The low emissivity coating 30 of any of clauses 25 to 27, wherein the first film 52 and/or the third film 56 and/or the optional fourth film 57 has a geometric thickness in the range of 1 nm to 20 nm, preferably a geometric thickness in the range of 5 nm to 15 nm.

Clause 29: The low emissivity coating 30 of any of clauses 25 to 28, wherein the second film 54 has a geometric thickness in the range of 62 nm to 84 nm, preferably a geometric thickness in the range of 72 nm to 85 nm.

Clause 30: The low emissivity coating 30 of any of clauses 1 to 29, wherein the second metal functional layer 58 comprises silver.

Clause 31: The low emissivity coating 30 of any of clauses 1 to 30, wherein the second metal functional layer 58 has a geometric thickness in the range of 7 nm to 11 nm, preferably a geometric thickness in the range of 8.3 nm to 9.5 nm, more preferably a geometric thickness in the range of 8.7 nm to 9.2 nm.

Clause 32: The low emissivity coating 30 of any of clauses 2 to 31, wherein the second primer layer 60 comprises titanium.

Clause 33: The low emissivity coating 30 of any of clauses 2 to 32, wherein the second primer layer 60 has a geometric thickness in the range of 1.5 nm to 3.6 nm, preferably a geometric thickness in the range of 1.8 nm to 3.2 nm, more preferably a geometric thickness in the range of 1.9 nm to 3.1 nm.

Clause 34: The low emissivity coating 30 of any of clauses 1 to 33, wherein the third phase adjustment layer 62 has an optical thickness in the range of 46 nm to 73 nm, preferably an optical thickness in the range of 55 nm to 68 nm, more preferably an optical thickness in the range of 57 nm to 67 nm.

Clause 35: The low emissivity coating 30 of any of clauses 1 to 34, wherein the third phase adjustment layer 62 has a geometric thickness in the range of 23 nm to 40 nm, preferably a geometric thickness in the range of 27 nm to 35 nm, more preferably a geometric thickness in the range of 28 nm to 34 nm.

Clause 36: The low emissivity coating 30 of any of clauses 1 to 35, wherein the third phase adjustment layer 62 comprises a first film 64 and a second film 66.

Clause 37: The low emissivity coating 30 of clause 36, wherein the first film 64 comprises a metal oxide, preferably a doped metal oxide, more preferably tin doped zinc oxide. For example, ZnO 90/10.

Clause 38: The low emissivity coating 30 of clauses 36 or 37, wherein the second film 66 comprises a metal alloy oxide material, preferably zinc stannate.

Clause 39: The low emissivity coating 30 of any of clauses 36 to 38, wherein the first film 64 has a geometric thickness in the range of 1 nm to 20 nm, preferably a geometric thickness in the range of 5 nm to 15 nm.

Clause 40: The low emissivity coating 30 of any of clauses 36 to 39, wherein the second film 66 has a geometric thickness in the range of 9 nm to 32 nm, preferably a geometric thickness in the range of 14 nm to 28 nm.

Clause 41: The low emissivity coating 30 of any of clauses 2 to 40, wherein the protective layer 92 is selected from the group consisting of a metal, a metal oxide, and a metal nitride, preferably titania.

Clause 42: The low emissivity coating 30 of any of clauses 2 to 41, wherein the protective layer 92 has a geometric thickness in the range of 4 nm to 5.5 nm, preferably a geometric thickness in the range of 4.3 nm to 5.25 nm, more preferably a geometric thickness in the range of 4.4 nm to 5.05 nm.

Clause 43: The low emissivity coating 30 of any of clauses 1 to 42, wherein the coating 30 has an emissivity in the range of 0.035 to 0.065, preferably in the range of 0.04 to 0.06.

Clause 44: The low emissivity coating 30 of any of clauses 1 to 43, wherein the coating 30 provides a reference IGU SHGC in the range of 0.4 to 0.65, preferably in the range of 0.5 to 0.6, more preferably in the range of 0.55 to 0.59.

Clause 45: The low emissivity coating 30 of any of clauses 1 to 44, wherein the coating 30 provides a reference IGU Winter/night U factor in the range of 0.2 to 0.4 BTU/hr-ft$^2$-° F. (1.14 to 2.27 W/m2-K), preferably in the range of 0.23 to 0.31 BTU/hr-ft$^2$-° F. (1.31 to 1.76 W/m2-K), more preferably in the range of 0.24 to 0.30 BTU/hr-ft-° F. (1.36 to 1.70 W/m2-K).

Clause 46: The low emissivity coating 30 of any of clauses 1 to 45, wherein the coating 30 provides a reference IGU exterior visible reflectance in the range of 5 to 20 percent, preferably in the range of 10 to 15 percent, more preferably in the range of 11 to 13 percent.

Clause 47: The low emissivity coating 30 of any of clauses 1 to 46, wherein the coating 30 provides a reference IGU visible light transmittance in the range of 60 to 95 percent, preferably in the range of 70 to 80 percent, more preferably in the range of 72 to 76 percent.

Clause 48: The low emissivity coating 30 of any of clauses 1 to 47, wherein the coating 30 provides a reference IGU transmitted L* in the range of 80 to 95, preferably in the range of 85 to 91, more preferably in the range of 88 to 90.

Clause 49: The low emissivity coating 30 of any of clauses 1 to 48, wherein the coating 30 provides a reference IGU transmitted a* in the range of 1 to −4, preferably in the range of −0.05 to −2.75, more preferably in the range of −1 to −2.5.

Clause 50: The low emissivity coating 30 of any of clauses 1 to 49, wherein the coating 30 provides a reference IGU transmitted b* in the range of 3 to −1, preferably in the range of 0.5 to 2, more preferably in the range of 0.7 to 1.5.

Clause 51: The low emissivity coating 30 of any of clauses 1 to 50, wherein the coating 30 provides a reference IGU exterior reflected L* in the range of 30 to 50, preferably in the range of 40 to 45, more preferably in the range of 41 to 43.

Clause 52: The low emissivity coating 30 of any of clauses 1 to 51, wherein the coating 30 provides a reference IGU exterior reflected a* in the range of 3 to −3.5, preferably in the range of −1 to −2.75, more preferably in the range of −1.5 to −2.7.

Clause 53: The low emissivity coating 30 of any of clauses 1 to 52, wherein the coating 30 provides a reference IGU exterior reflected b* in the range of 3 to −3, preferably in the range of 1 to −1, more preferably in the range of 0.5 to −0.5.

Clause 54: The low emissivity coating 30 of any of clauses 1 to 53, wherein the coating 30 is a tempered coating.

Clause 55: The low emissivity coating 30 of clause 54, wherein the first phase adjustment layer 40 has an optical thickness in the range of 75 nm to 112 nm, preferably an optical thickness in the range of 84 nm to 103 nm, more preferably an optical thickness in the range of 93 nm to 95 nm.

Clause 56: The low emissivity coating 30 of clauses 54 or 55, wherein the first phase adjustment layer 40 has a geometric thickness in the range of 37 nm to 56 nm, preferably a geometric thickness in the range of 44 nm to 49 nm, more preferably a geometric thickness in the range of 46 nm to 48 nm.

Clause 57: The low emissivity coating 30 of any of clauses 54 to 56, wherein the first phase adjustment layer 40 comprises a first film 42 and a second film 44, and the second film 44 has a geometric thickness in the range of 1 nm to 20 nm, preferably a geometric thickness in the range of 5 nm to 15 nm.

Clause 58: The low emissivity coating 30 of clause 57, wherein the first film 42 has a geometric thickness in the range of 26 nm to 46 nm, preferably a geometric thickness in the range of 32 nm to 42 nm.

Clause 59: The low emissivity costing 30 of any of clauses 54 to 58, wherein the first metal functional layer 46 has a geometric thickness in the range of 5 nm to 8 nm, preferably a geometric thickness in the range of 6.5 nm to 7 nm, more preferably a geometric thickness in the range of 6.6 nm to 6.8 nm.

Clause 60: The low emissivity coating 30 of any of clauses 54 to 59, wherein the first primer layer 48 has a geometric thickness in the range of 2.5 nm to 3.6 nm, preferably a geometric thickness in the range of 2.8 nm to 3.2 nm, more preferably a geometric thickness in the range of 2.9 nm to 3.1 nm.

Clause 61: The low emissivity coating 30 of any of clauses 54 to 60, wherein the second phase adjustment layer 50 has an optical thickness in the range of 136 nm to 204 nm, preferably an optical thickness in the range of 161 nm to 178 nm, more preferably in the range of 168 nm to 172 nm.

Clause 62: The low emissivity coating 30 of any of clauses 54 to 61, wherein the second phase adjustment layer 50 has a geometric thickness in the range of 68 nm to 102 nm, preferably a geometric thickness in the range of 80 nm to 89 nm, more preferably a geometric thickness in the range of 84 nm to 86 nm.

Clause 63: The low emissivity coating 30 of any of clauses 54 to 62, wherein the second phase adjustment layer 50 comprises a first film 52, a second film 54, a third film 56, and optionally a fourth film 57, and wherein the first film 54 and/or the third film 56 and/or the optional fourth film 57 has a geometric thickness in the range of 1 nm to 20 nm, preferably a geometric thickness in the range of 5 nm to 15 nm.

Clause 64: The low emissivity coating 30 of clause 63, wherein the second film 54 has a geometric thickness in the range of 65 nm to 84 nm, preferably a geometric thickness in the range of 75 nm to 85 nm.

Clause 65: The low emissivity coating 30 of any of clauses 54 to 64, wherein the second metal functional layer 58 has a geometric thickness in the range of 7 nm to 11 nm, preferably a geometric thickness in the range of 8.5 nm to 9.5 nm, more preferably a geometric thickness in the range of 9 nm to 9.2 nm.

Clause 66: The low emissivity coating 30 of any of clauses 54 to 65, wherein the second primer layer 60 has a geometric thickness in the range of 2.5 nm to 3.6 nm, preferably a geometric thickness in the range of 2.8 nm to 3.2 nm, more preferably a geometric thickness in the range of 2.9 nm to 3.1 nm.

Clause 67: The low emissivity coating 30 of clause 66, wherein the third phase adjustment layer 62 has an optical thickness in the range of 46 nm to 70 nm, preferably an optical thickness in the range of 55 nm to 61 nm, more preferably an optical thickness in the range of 57 nm to 59 nm.

Clause 68: The low emissivity coating 30 of any of clauses 54 to 67, wherein the third phase adjustment layer 62 has a geometric thickness in the range of 23 nm to 35 nm, preferably a geometric thickness in the range of 27 nm to 31 nm, more preferably a geometric thickness in the range of 28 nm to 30 nm.

Clause 69: The low emissivity coating 30 of any of clauses 54 to 68, wherein the third phase adjustment layer 62 comprises a first film 64 and a second film 66.

Clause 70: The low emissivity coating 30 of clause 69, wherein the first film 64 has a geometric thickness in the range of 1 nm to 20 nm, preferably a geometric thickness in the range of 5 nm to 15 nm.

Clause 71: The low emissivity coating 30 of clauses 69 or 70, wherein the second film 66 has a geometric in the range of 9 nm to 28 nm, preferably a geometric thickness in the range of 14 nm to 24 nm.

Clause 72: The low emissivity coating 30 of any of clauses 54 to 71, wherein the protective layer 92 has a geometric thickness in the range of 4.5 nm to 5.5 nm, preferably a geometric thickness in the range of 4.75 nm to 5.25 nm, more preferably a geometric thickness in the range of 4.95 nm to 5.05 nm.

Clause 73: The low emissivity coating 30 of any of clauses 54 to 72, wherein the coating 30 provides a reference IGU SHGC in the range of 0.55 to 0.585, preferably in the range of 0.57 to 0.58.

Clause 74: The low emissivity coating 30 of any of clauses 54 to 73, wherein the coating 30 provides a reference IGU Winter/night U factor in the range of 0.28 to 0.32 BTU/hr-ft$^2$-° F. (1.8 to 1.8 W/m2-K), preferably in the range of 0.29 to 0.30 BTU/hr-ft$^2$-° F. (1.66 to 1.68 W/m2-K).

Clause 75: The low emissivity coating 30 of any of clauses 1 to 53, wherein the coating 30 is a non-tempered coating.

Clause 76: The low emissivity coating 30 of clause 75, wherein the first phase adjustment layer 40 has an optical thickness in the range of 72 nm to 108 nm, preferably an optical thickness in the range of 85 nm to 94 nm, more preferably an optical thickness in the range of 89 nm to 91 nm.

Clause 77: The low emissivity coating 30 of clauses 75 or 76, wherein the first phase adjustment layer 40 has a geometric thickness in the range of 38 nm to 54 nm, preferably a geometric thickness in the range of 42 nm to 47 nm, more preferably a geometric thickness in the range of 44 nm to 48 nm.

Clause 78: The low emissivity coating 30 of any of clauses 75 to 77, wherein the first phase adjustment layer 40 comprises a first film 42 and a second film 44, and the first film 42 has a geometric thickness in the range of 1 nm to 20 nm, preferably a geometric thickness in the range of 5 nm to 15 nm.

Clause 79: The low emissivity coating 30 of clause 78, wherein the second film 44 has a geometric thickness in the range of 24 nm to 44 nm, preferably a geometric thickness in the range of 30 nm to 40 nm.

Clause 80: The low emissivity coating 30 of any of clauses 75 to 79, wherein the first metal functional layer 46 has a geometric thickness in the range of 5.5 nm to 8.5 nm, preferably a geometric thickness in the range of 6.8 nm to 7.5 nm, more preferably a geometric thickness in the range of 7 nm to 7.3 nm.

Clause 81: The low emissivity coating 30 of any of clauses 75 to 80, wherein the first primer layer 48 has a geometric thickness in the range of 1.5 nm to 2.5 nm, preferably a geometric thickness in the range of 1.8 nm to 2.2 nm, more preferably a geometric thickness in the range of 1.9 nm to 2.1 nm.

Clause 82: The low emissivity coating 30 of any of clauses 75 to 81, wherein the second phase adjustment layer 50 has an optical thickness in the range of 147 nm to 181 nm, preferably an optical thickness in the range of 155 nm to 172 nm, more preferably in the range of 162 nm to 186 nm.

Clause 83: The low emissivity coating 30 of any of clauses 75 to 82, wherein the second phase adjustment layer 50 has a geometric thickness in the range of 65 nm to 98 nm, preferably a geometric thickness in the range of 77 nm to 86 nm, more preferably a geometric thickness in the range of 81 nm to 83 nm.

Clause 84: The low emissivity coating 30 of any of clauses 75 to 83, wherein the second phase adjustment layer 50 comprises a first film 52, a second film 54, a third film 56, and optionally a fourth film 57, and wherein the first film 52 and/or the third film 56 and/or the optional fourth film 57 has a geometric thickness in the range of 1 nm to 20 nm, preferably a geometric thickness in the range of 5 nm to 15 nm.

Clause 85: The low emissivity coating 30 of clause 84, wherein the second film 54 has a geometric thickness in the range of 62 nm to 81 nm, preferably a geometric thickness in the range of 72 nm to 77 nm.

Clause 86: The low emissivity coating 30 of any of clauses 75 to 85, wherein the second metal functional layer 58 has a geometric thickness in the range of 7 nm to 11 nm, preferably a geometric thickness in the range of 8.3 nm to 9.5 nm, more preferably a geometric thickness in the range of 8.7 nm to 8.9 nm.

Clause 87: The low emissivity coating 30 of any of clause 75 to 86, wherein the second primer layer 60 has a geometric thickness in the range of 1.5 nm to 2.5 nm, preferably a geometric thickness in the range of 1.8 nm to 2.2 nm, more preferably a geometric thickness in the range of 1.9 nm to 2.1 nm.

Clause 88: The low emissivity coating 30 of any of clauses 75 to 87, wherein the third phase adjustment layer 62 has an optical thickness in the range of 59 nm to 73 nm, preferably an optical thickness in the range of 62 nm to 68 nm, more preferably an optical thickness in the range of 65 nm to 67 nm.

Clause 89: The low emissivity coating 30 of any of clauses 75 to 88, wherein the third phase adjustment layer 62 has a geometric thickness in the range of 26 nm to 40 nm, preferably a geometric thickness in the range of 31 nm to 35 nm, more preferably a geometric thickness in the range of 32 nm to 34 nm.

Clause 90: The low emissivity coating 30 of any of clauses 75 to 89, wherein the third phase adjustment layer 62 comprises a first film 64 and a second film 66.

Clause 91: The low emissivity coating 30 of clause 90, wherein the first film 64 has a geometric thickness in the range of 1 nm to 20 nm, preferably a geometric thickness in the range of 5 nm to 15 nm.

Clause 92: The low emissivity coating 30 of clauses 90 or 91, wherein the second film 66 has a geometric in the range of 13 nm to 32 nm, preferably a geometric thickness in the range of 18 nm to 28 nm.

Clause 93: The low emissivity coating 30 of any of clauses 75 to 92, wherein the protective layer 92 has a geometric thickness in the range of 4 nm to 5 nm, preferably a geometric thickness in the range of 4.3 nm to 4.7 nm, more preferably a geometric thickness in the range of 4.4 nm to 4.6 nm.

Clause 94: The low emissivity coating 30 of any of clauses 75 to 93, wherein the coating 30 provides a reference IGU SHGC in the range of 0.56 to 0.57, preferably in the range of 0.562 to 0.566.

Clause 95: The low emissivity coating 30 of any of clauses 75 to 94, wherein the coating 30 provides a reference IGU Winter/night U factor in the range of 0.299 to 0.320 BTU/hr-ft$^2$-° F. (1.7 to 1.82 W/m2-K), preferably in the range of 0.301 to 0.308 BTU/hr-ft$^2$-° F. (1.71 to 1.75 W/m2-K).

Clause 96: The low emissivity coating 30 of any of clause 1 to 95, wherein the low emissivity coating 30 includes only two metal functional layers 46,58.

Clause 97: The low emissivity coating 30 of any of clauses 1 to 96, wherein the first metal functional layer 46 is thinner than the second metal functional layer 58.

Clause 98: The low emissivity coating 30 of any of clauses 1 to 97, wherein the first metal functional layer 46 has a geometric thickness in the range of 6 nm to 8 nm, preferably in the range of 6.5 nm to 7.5 nm.

Clause 99: The low emissivity coating 30 of any of clauses 1 to 98, wherein the second metal functional layer 58 has a geometric thickness in the range of 8 nm to 10 nm, preferably in the range of 8.5 nm to 9.5 nm.

Clause 100: The low emissivity coating 30 of any of clauses 1 to 99, wherein a ratio of the geometric thickness of the first metal functional layer 46 divided by the geometric thickness of the second metal functional layer 58 is in the range of 0.6 to 1.

Clause 101: The low emissivity coating 30 of any of clauses 1 to 100, wherein the low emissivity coating 30 comprises a first phase adjustment layer 40 comprising oxides of zinc and tin and having an optical thickness in the range of 84 nm to 103 nm; the first metal functional layer 48 located over the first phase adjustment layer 40 and comprising silver having a geometric thickness in the range of 6 nm to 8 nm; a first primer layer 48 located over the first metal functional layer 46; a second phase adjustment layer 50 located over the first primer layer 48 and comprising oxides of zinc and tin having an optical thickness in the range of 155 nm to 178 nm; the second metal functional layer 58 located over the second phase adjustment layer 50 and comprising silver having a geometric thickness in the range of 8 nm to 10 nm; a second primer layer 60 located over the second metal functional layer 58; a third phase adjustment layer 62 located over the second primer layer 60 and comprising oxides of zinc and tin having an optical thickness in the range of 55 nm to 68 nm; and a protective layer 92 located over the third phase adjustment layer 62 and having an optical thickness in the range of 10.5 to 13.

Clause 102: An insulating glass unit 100, 200 comprising the low emissivity coating 30 of any of clauses 1 to 101.

Clause 103: The insulating glass unit 100, 200 of clause 102, wherein the insulating glass unit 100, 200 is a double glazed insulating glass unit 100 with the low emissivity coating 30 on a No. 3 surface.

Clause 104: The insulating glass unit 100, 200 of clause 102, wherein the insulating glass unit 100, 200 is a triple glazed insulating glass unit 200 with the low emissivity coating 30 on a No. 5 surface.

Clause 105: The insulating glass unit 100, 200 of clause 102, wherein the insulating glass unit 100, 200 is a triple glazed insulating glass unit 200 with the low emissivity coating 30 on a No. 5 surface and a second coating 238 located on the No. 2 surface 216, the No. 3 surface 220, or the No. 4 surface 222, preferably on the No. 2 surface 216 or the No. 3 surface 220, more preferably on the No. 2 surface.

Clause 106: The insulating glass unit 200 of clause 105, wherein the second coating 238 is the same as the first coating 30.

Clause 107: The insulating glass unit 200 of clauses 105 or 106, wherein the second coating 238 is different than the first coating 30.

Clause 108: The insulating glass unit 200 of any of clauses 105 to 107, wherein the first coating 30 has two metal functional layers 46, 58 and the second coating 238 has only one metal functional layer.

Clause 109: The insulating glass unit 200 of any of clauses 105 to 108, wherein the second coating 238 has a higher SHGC than the first coating 30.

Clause 110: The insulating glass unit 200 of any of clauses 105 to 109, wherein the second coating 238 has a higher U factor than the first coating 30.

Clause 111: The use of a low emissivity coating 30 of any of clauses 1 to 101 in an IGU 100, 200.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:
1. A low emissivity coating, comprising:
   a first phase adjustment layer comprising oxides of zinc and tin;
   a first metal functional layer located over the first phase adjustment layer and comprising silver having a geometric thickness in the range of 6 nm to 8 nm;
   a first primer layer located over the first metal functional layer;
   a second phase adjustment layer located over the first primer layer and comprising oxides of zinc and tin having an optical thickness in the range of 155 nm to 178 nm;
   a second metal functional layer located over the second phase adjustment layer and comprising silver having a geometric thickness in the range of 8 nm to 10 nm;
   a second primer layer located over the second metal functional layer;

a third phase adjustment layer located over the second primer layer; and a protective layer located over the third phase adjustment layer;

wherein the low emissivity coating provides a reference IGU summer/day SHGC of at least 0.4 and a reference IGU winter/night U factor of no greater than 0.4 BTU/hr-ft$^2$-° F.

2. The low emissivity coating of claim 1, wherein the low emissivity coating includes only two metal functional layers.

3. The low emissivity coating of claim 1, wherein the first metal functional layer is thinner than the second metal functional layer.

4. The low emissivity coating of claim 1, wherein the first metal functional layer has a geometric thickness in the range of 6.5 nm to 7.5 nm.

5. The low emissivity coating of claim 1, wherein the second metal functional layer has a geometric thickness in the range of 8.5 nm to 9.5 nm.

6. The low emissivity coating of claim 1, wherein the low emissivity coating has an emissivity in the range of 0.04 to 0.06.

7. The low emissivity coating of claim 1, wherein the low emissivity coating provides a reference IGU SHGC in the range of 0.4 to 0.65.

8. The low emissivity coating of claim 1, wherein the coating is a tempered coating.

9. The low emissivity coating of claim 1, wherein the coating is a non-tempered coating.

10. The low emissivity coating of claim 1, wherein the low emissivity coating comprises:

a first phase adjustment layer having an optical thickness in the range of 84 nm to 103 nm;

a third phase adjustment layer comprising oxides of zinc and tin having an optical thickness in the range of 55 nm to 68 nm; and a protective layer having an optical thickness in the range of 10.5 to 13 nm.

11. An insulating glass unit, comprising:

a plurality of glass plies; and a low emissivity coating located on a major surface of at least one of the glass plies, the low emissivity coating comprising:

a first phase adjustment layer comprising oxides of zinc and tin;

a first metal functional layer located over the first phase adjustment layer and comprising silver having a geometric thickness in the range of 6 nm to 8 nm;

a first primer layer located over the first metal functional layer;

a second phase adjustment layer located over the first primer layer and comprising oxides of zinc and tin having an optical thickness in the range of 155 nm to 178 nm;

a second metal functional layer located over the second phase adjustment layer and comprising silver having a geometric thickness in the range of 8 nm to 10 nm;

a second primer layer located over the second metal functional layer;

a third phase adjustment layer located over the second primer layer; and a protective layer located over the third phase adjustment layer;

wherein the low emissivity coating provides a reference IGU summer/day SHGC of at least 0.4 and a reference IGU winter/night U factor of no greater than 0.4 BTU/hr-ft$^2$-° F.

12. The insulating glass unit of claim 11, wherein the low emissivity coating includes only two metal functional layers.

13. The insulating glass unit of claim 11, wherein the first metal functional layer is thinner than the second metal functional layer.

14. The insulating glass unit of claim 11, wherein the insulating glass unit is selected from the group consisting of a double glazed unit with the low emissivity coating on a No. 3 surface and a triple glazed unit with the low emissivity coating on a No. 5 surface.

\* \* \* \* \*